US011258833B2

(12) United States Patent
Ranade et al.

(10) Patent No.: US 11,258,833 B2
(45) Date of Patent: Feb. 22, 2022

(54) TRANSMITTING COMMON MODE CONTROL DATA OVER AUDIO RETURN CHANNEL

(71) Applicant: Lattice Semiconductor Corporation, Portland, OR (US)

(72) Inventors: Shrikant Ranade, Campbell, CA (US); Lei Ming, San Jose, CA (US); Jiong Huang, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 17/144,929

(22) Filed: Jan. 8, 2021

(65) Prior Publication Data
US 2021/0136126 A1  May 6, 2021

Related U.S. Application Data

(63) Continuation of application No. 15/829,670, filed on Dec. 1, 2017, now Pat. No. 10,931,722.
(Continued)

(51) Int. Cl.
*H04L 29/06* (2006.01)
*H04L 65/1069* (2022.01)
(Continued)

(52) U.S. Cl.
CPC ...... *H04L 65/1069* (2013.01); *G06F 11/0709* (2013.01); *G06F 11/079* (2013.01);
(Continued)

(58) Field of Classification Search
CPC ... H04L 65/1069; H04L 1/0058; H04L 65/60; G06F 11/0709; G06F 11/0757;
(Continued)

(56) References Cited

U.S. PATENT DOCUMENTS 7,765,599 B2 * 7/2010 Casas .................... H04L 65/607
726/26
7,836,223 B2  11/2010 Butcher
(Continued)

FOREIGN PATENT DOCUMENTS

CN      106254912 A   12/2016
WO   WO 2016/060447 A2   4/2016

OTHER PUBLICATIONS

European Patent Office, Extended European Search Report and Opinion, EP Patent Application No. 18781585.7, dated Nov. 9, 2020, eight pages.
(Continued)

*Primary Examiner* — Viet D Vu
(74) *Attorney, Agent, or Firm* — Haynes and Boone, LLP

(57) ABSTRACT

A source device and a sink device may be connected using an interface cable comprising at least first and second physical channels. The first physical channel may be used to transmit video data unidirectionally from the source device to the sink device. In addition, the second physical channel may comprise an audio return channel wherein audio data can be transmitted unidirectionally from the sink device to the source device at a first rate. In addition, the second physical channel may also transmit bidirectional control data between the source and sink devices at a second rate slower than the first rate. The audio data may be overlaid on the control data, wherein the audio data is transmitted using differential signaling, while the control data is transmitted using common mode signaling.

18 Claims, 9 Drawing Sheets

Related U.S. Application Data

(60) Provisional application No. 62/481,429, filed on Apr. 4, 2017.

(51) Int. Cl.

| | | |
|---|---|---|
| *H04L 65/60* | (2022.01) | |
| *H04N 21/44* | (2011.01) | |
| *H04N 21/4363* | (2011.01) | |
| *G06F 11/07* | (2006.01) | |
| *H04L 1/00* | (2006.01) | |
| *H04N 21/81* | (2011.01) | |
| *H04L 1/16* | (2006.01) | |
| *H04N 21/439* | (2011.01) | |
| *H04L 1/18* | (2006.01) | |

(52) U.S. Cl.
CPC ........ *G06F 11/0757* (2013.01); *H04L 1/0058* (2013.01); *H04L 1/1607* (2013.01); *H04L 65/60* (2013.01); *H04L 65/607* (2013.01); *H04N 21/43635* (2013.01); *H04N 21/44* (2013.01); *H04N 21/8106* (2013.01); *H04L 1/0057* (2013.01); *H04L 1/1854* (2013.01); *H04N 21/439* (2013.01)

(58) Field of Classification Search
CPC ............ G06F 11/079; H04N 21/43635; H04N 21/22; H04N 21/439
See application file for complete search history.

(56) References Cited

U.S. PATENT DOCUMENTS

| | | | | |
|---|---|---|---|---|
| 8,910,009 | B1* | 12/2014 | Tang | .................... H04L 7/04 714/752 |
| 2007/0257923 | A1 | 11/2007 | Whitby-Strevens | |
| 2009/0013095 | A1 | 1/2009 | Butcher | |
| 2009/0116583 | A1 | 5/2009 | Lida et al. | |
| 2009/0245345 | A1 | 10/2009 | Lee et al. | |
| 2012/0099600 | A1 | 4/2012 | Tsai | |
| 2012/0163609 | A1* | 6/2012 | Lee | .................. G06F 3/162 381/23 |
| 2012/0317608 | A1 | 12/2012 | Chu et al. | |
| 2013/0021536 | A1 | 1/2013 | Kamida | |
| 2013/0159565 | A1* | 6/2013 | Soyannwo | ............. G09G 5/006 710/33 |
| 2014/0016034 | A1 | 1/2014 | Cirstea | |
| 2014/0327833 | A1 | 11/2014 | Kabuto | |
| 2016/0006584 | A1 | 1/2016 | Agrawal et al. | |
| 2016/0299862 | A1 | 10/2016 | Corbin et al. | |
| 2017/0006336 | A1 | 1/2017 | Lee et al. | |
| 2018/0165240 | A1* | 6/2018 | Reinig | ................ G06F 13/1642 |

OTHER PUBLICATIONS

Morrison, G., "HDMI 2.1: What you need to know," Jan. 12, 2017, seven pages. [Online] [Retrieved on Jul. 12, 2018] Retrieved from the internet URL: https://www.cnet.com/news/hdmi-2-1-what-you-need-to-know/#">.

PCT International Search Report and Written Opinion, PCT Application No. PCT/US2018/022942, dated Jul. 31, 2018, 12 pages.

United States Office Action, U.S. Appl. No. 15/829,670, filed Feb. 13, 2020, nine pages.

United States Office Action, U.S. Appl. No. 15/829,670, filed Nov. 6, 2019, eight pages.

China National Intellectual Property Administration, Office Action, CN Patent Application No. 201880023551.6, Mar. 29, 2021, 15 pages.

Intellectual Property India, Examination Report, IN Patent Application No. 201947037574, Apr. 13, 2021, five pages.

* cited by examiner

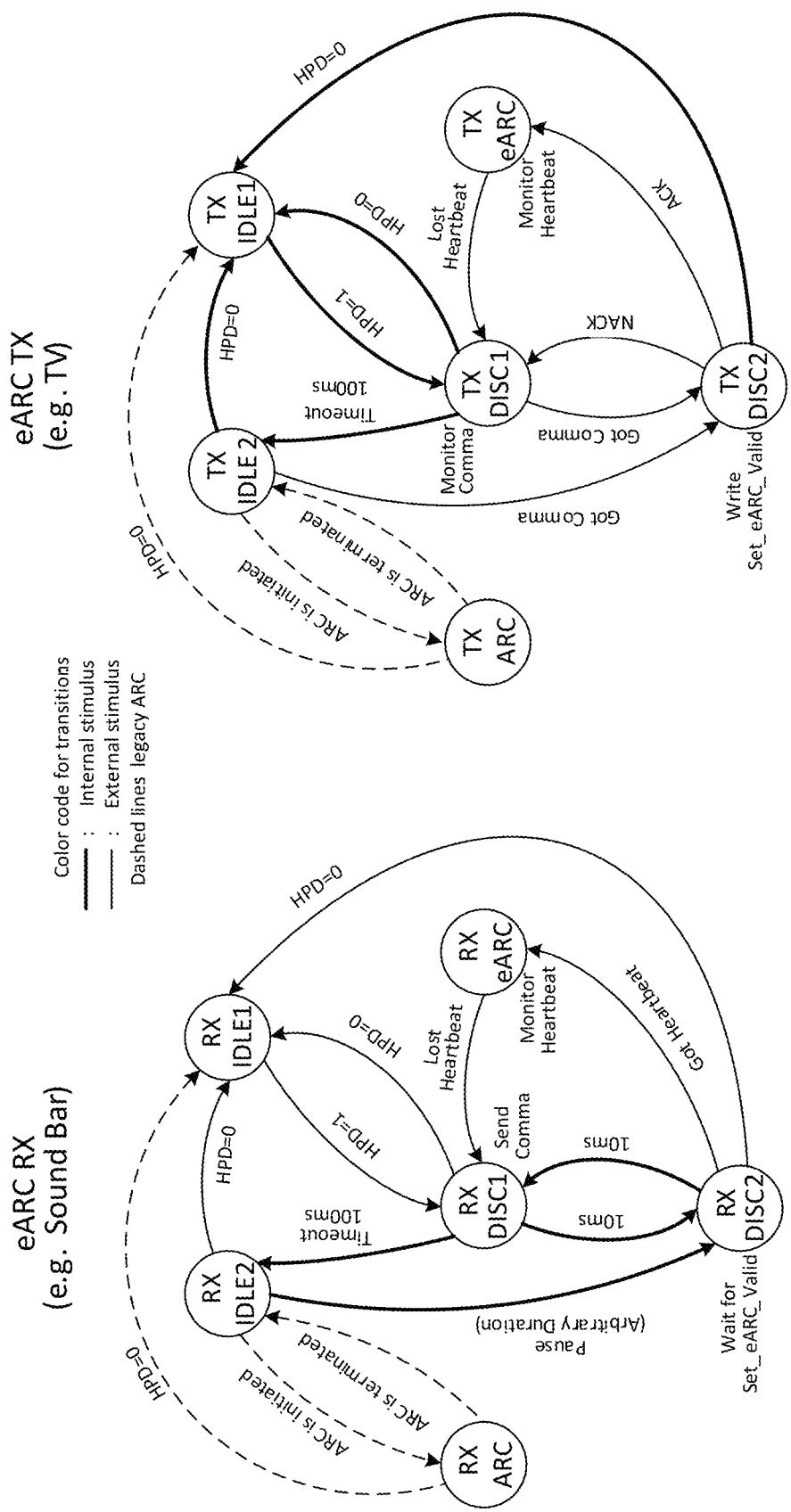

TRANSMITTING COMMON MODE CONTROL DATA OVER AUDIO RETURN CHANNEL

CROSS-REFERENCE TO RELATED APPLICATIONS

This application is a continuation of U.S. application Ser. No. 15/829,670, filed on Dec. 1, 2017 (now U.S. Pat. No. 10,931,722, issued on Feb. 23, 2021), which claims the benefit of U.S. Provisional Application No. 62/481,429, filed on Apr. 4, 2017, both of which are incorporated by reference in their entirety.

BACKGROUND

The present disclosure relates to data communications, and more specifically to the concurrent transmission of control data and audio data.

Video and audio data is typically transferred from one device to another across communication channels such as a high definition multimedia interface (HDMI) cable. For example, and HDMI cable may be used to transfer high resolution video data unidirectionally from a source device such as an audio/video receiver (AVR) to a sink device (e.g., a display device such as a TV).

In some cases, the sink device may receive audio and/or video data from another source (e.g., via an antenna, a wireless internet connection, a second source device, and/or the like). As such, there may be a need for the sink device to transmit audio data back to the source device. For example, the sink device may display the received video data, while transmitting the audio data through the HDMI cable to the source device to be played by a speaker system associated with the source device.

SUMMARY

Embodiments relate to concurrent transmission of audio data and control data between a sink device and a source device over the same physical channel. The source and sink devices may be connected via an interface cable (e.g., an HDMI cable) comprising a plurality of ports divided into a first group of ports forming a first physical channel, and a second group of ports forming a second physical channel. The source device transmits unidirectional video data to the sink device over the first physical channel. In addition, the sink device may transmit unidirectional audio data to the source device over the second physical channel.

In some embodiments, the audio data may comprise audio return data. The sink and source devices may transmit control data between them over the second physical channel.

In some embodiments, the audio data is transmitted using differential signaling at a first rate, and the control data is transmitted using common mode signal at a second rate slower than the first rate.

In some embodiments, the control data comprises read and write transactions transmitted between the source and sink devices.

In some embodiments, the control data is transmitted in a half duplex mode. The sink device may function as a master device, and initiate each read or write transaction. The source device may function as a slave device that transmits packets of control data to the sink device during designated response windows following the transmission of a packet of control data from the sink device to the source device.

Embodiments also relate to concurrently transmitting audio and control data between a sink and source device. Uncompressed video data is received from a source device over a first physical channel where the first physical channel is a unidirectional physical channel. A discovery signal is received from the source device over a second physical channel separate from first physical channel to confirm support of a bidirectional communication mode by the source device. After receiving the discovery signal, bidirectional communication is established. During bidirectional communication, control data is transmitted to and from the source device using a common mode signal over the second physical channel. The common mode signal is transmitted at a first speed. In addition, an audio signal is transmitted over the second physical channel to the source device. The audio signal is overlaid on the common mode signal and transmitted at a second speed higher than the first speed

BRIEF DESCRIPTION OF THE DRAWINGS

FIGS. 4A and 4B illustrate example state diagrams establishing bidirectional communication between a sink device and a source device, in accordance with one embodiment.

Figure 1:
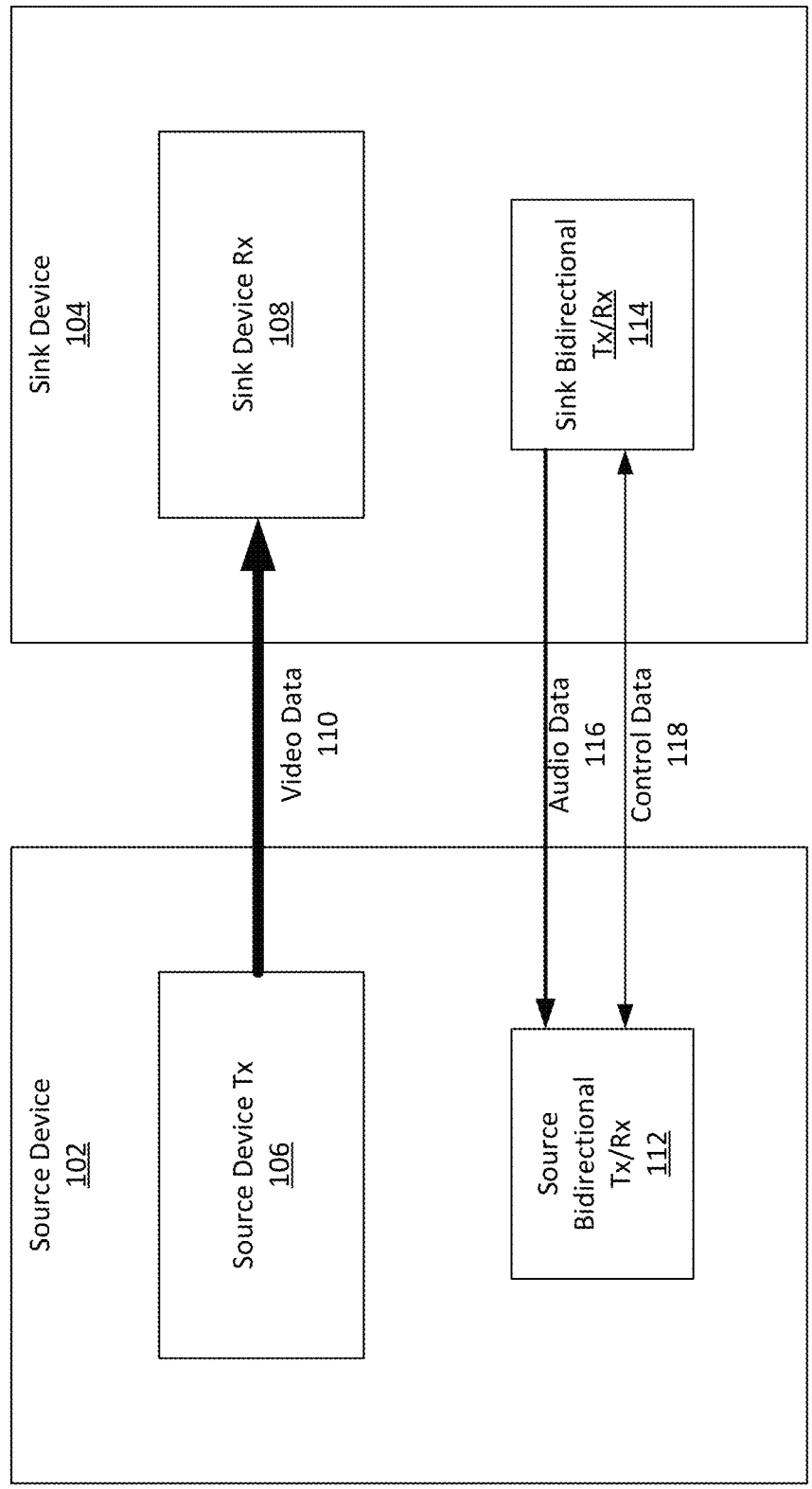
FIG. 1 illustrates a schematic diagram of a source and sink device communicating over first and second physical channels, in accordance with one embodiment.

The figures depict embodiments of the present disclosure for purposes of illustration only.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Embodiments relate to concurrent transmission of audio return data and control data between a sink device and a source device over the same physical channel independently of each other. The source and sink devices are connected by an interface cable, such as a High-Definition Multimedia Interface (HDMI) cable that includes a first physical channel and a second physical channel. The source device may transmit unidirectional video data to the sink device over the first physical channel while the sink device may transmit unidirectional audio data to the source device over the second physical channel. The sink and source devices may also transmit bidirectional control data between them over the second physical channel. The unidirectional audio data and the bidirectional control data may be overlaid on top of each other so that the audio data is transmitted via differential signaling at a first rate, while the control data is transmitted via common mode signaling at a second rate that is slower than the first rate.

Overall Overview of System

Figure (FIG.) 1 illustrates a schematic diagram of a source device 102 and a sink device 104 for communicating over first and second physical channels, in accordance with one embodiment. The source device 102 and the sink device 104 communicate with each other through a plurality of physical channels. The plurality of physical channels may be embodied as an interface cable (e.g., an HDMI cable).

The sink device 104 is a device that receives media data from a counterpart source device (e.g., source device 102) for reproduction. The sink device 104 may be embodied as a display device such as a television.

The source device 102 transmits the media data to the sink device 104 for reproduction. Example source device includes, among others, an audio/video receiver (AVR), a DVD or Blu-ray player, a set-top box, and a game console.

Although the sink device 104 generally receives media data from the source device 102, in certain settings, a sink device 104 may also receive media data from a source other than the source device 102. For example, a television connected to a source device such as DVD or game console may also receive media data via an alternative source such as an over-the-air antenna, a wireless internet connection, a second source device (e.g., another DVD or game console), and/or the like. In such settings, the sink device may send audio or other media data received via the alternative source through the interface cable to the source device 102. The source device 102 may then send the audio data to a speaker system for producing sound.

The interface cable (e.g., HDMI cable) connecting the source device 102 and the sink device 104 may include a first set of conductive lines forming a first physical channel, and a second set of conductive lines forming a second physical channel. For example, the first physical channel may be used to transmit video data 110 unidirectionally from a source device transmitter 106 of the source device 102 to a sink device receiver 108 of the sink device. The first physical channel may be embodied as a conductive line pairing transmitting data via transition-minimized differential signaling (TMDS). The second physical channel may be embodied as conductive lines, each connected to a hot plug detect (HPD) port and a utility (UTIL) port of the HDMI.

As illustrated in FIG. 1, the source device 102 and the sink device 104 may comprise a respective source bidirectional transmitter/receiver (Tx/Rx) 112 and a sink bidirectional Tx/Rx 114. The source and sink bidirectional Tx/Rx 112 and 114 may communicate over the second physical channel, which may be used to transmit audio data 116 unidirectionally from the sink bidirectional Tx/Rx 114 to the source bidirectional Tx/Rx 112. In addition, the second physical channel may transmit control data 118 bidirectionally between the sink bidirectional Tx/Rx 114 to the source bidirectional Tx/Rx 112.

The second physical channel may transmit control data 118 such as extended display identification data (EDID), instruction commands, and other status information between the sink device 104 and source device 102. The control data 118 may comprise, for example, HDCP (High-bandwidth Digital Content Protection) related control data such as periodic link integrity checks, eARC capability data transmitted from the source device 102 (acting as an audio sink) to the sink device 104 (acting as an audio source) which may be similar to EDID control data, and/or the like. In some embodiments, the control data 118 may be used to control one or more settings of the source device 102 by using a remote control associated with the sink device 104.

While embodiments are described herein primarily in relation to HDMI, other embodiments may be implemented using other types of data transmission standards such as DisplayPort or Mobile High-Definition Link (MHL).

Example Common Mode Transmission Scheme

In the following, the audio data transmission over the second physical channel is described as being performed using a falling edge modulation (FEM) scheme but embodiments are not limited to the FEM scheme. The FEM scheme or similar schemes (e.g., rising edge modulation schemes) are advantageous, among other reasons, because the audio or control data can be transmitted concurrently with a clock signal.

Figure 2:
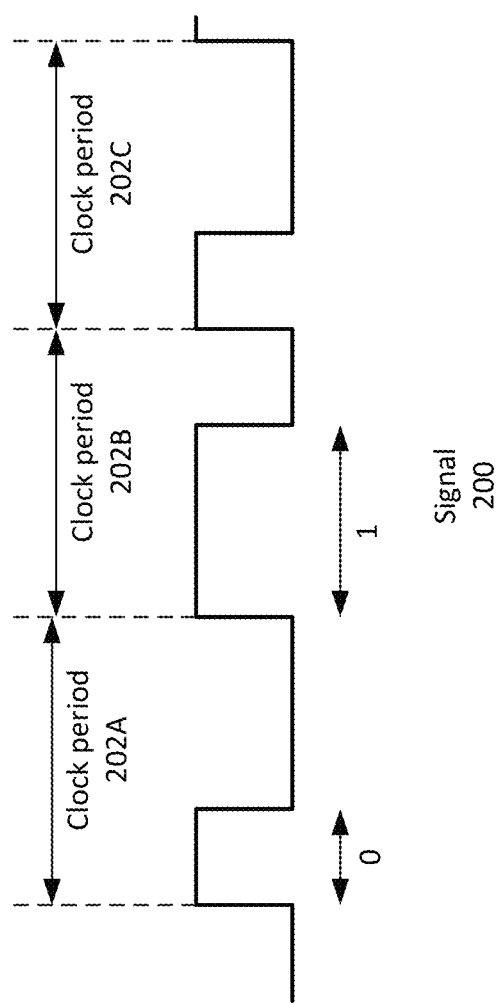
FIG. 2 illustrates a waveform associated with a falling edge modulation (FEM) for transmitting audio data or control data, in accordance with one embodiment.

FIG. 2 illustrates a waveform associated with a falling edge modulation (FEM) for transmitting audio data or control data, in accordance with one embodiment. As illustrated in FIG. 2, the signal 200 is divided into a plurality of clock periods 202A, 202B, 202C, etc. In each of the clock periods 202A, 202B, 202C, etc., a bit of media data (e.g., audio data) is transmitted. Each clock period 202 is defined by the rising edges of the signal 200.

The value of the bit of data transmitted during each clock period 202 in the signal 200 is determined based upon the timing of the falling edge of the signal 200 within each clock period 200. In the example of FIG. 2, if the falling edge is within a threshold amount of time from the rising edge, a value of "0" is signaled whereas if the falling edge appears after the threshold amount of time from the rising edge, a value of "1" is signaled instead. The value of the signal 200 is measured at a set amount of time after each rising edge (e.g., based upon the threshold amount of time) to determine a value of the signal. If the signal 200 is low, signifying that the falling edge has already occurred, then a value of "0" is signaled. If the signal 200 is high, signifying that the falling edge has not yet occurred, then a value of "1" is signaled.

Figure 3:
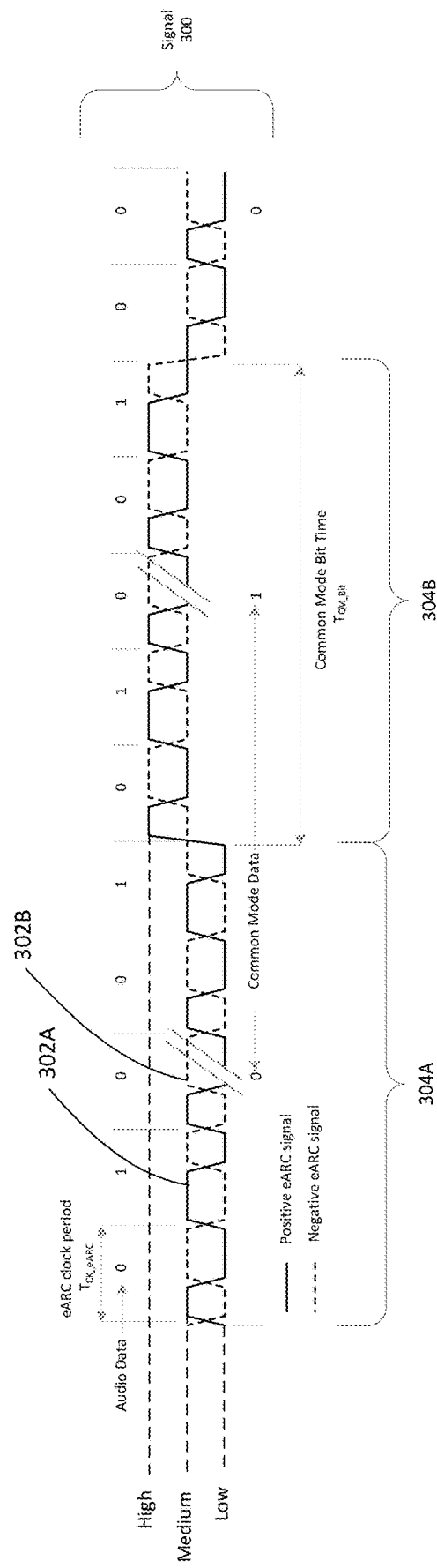
FIG. 3 illustrates an example of a common-mode bitstream for concurrently transmitting both audio data and control data between the source and sink devices over the second physical channels, in accordance with one embodiment.

FIG. 3 illustrates an example of a common-mode bitstream for concurrent transmittal of both audio data and control data between the source device 102 and the sink device 104 over the second physical channels, in accordance with one embodiment. The signal 300 of FIG. 3 is transmitted as a differential signal comprising a positive signal 302A, and a negative signal 302B. For example, in the context of HDMI, the positive signal 302A may be transmitted over a hotplug line of the HDMI cable, while the negative signal 302B is transmitted over a Util line of the HDMI cable, or vice versa.

Within the signal 300, the audio data is transmitted at a rate higher than the control data, and as such may be embedded within the control data. The audio data may be transmitted using the FEM scheme described above, while the control data is transmitted as a common mode signal. In other embodiments, the control data may also be transmitted using an FEM scheme.

The value of the signal 300 (comprising positive signal 302A and negative signal 302B) may range between three different states (e.g., low, medium, high). The value for the common mode control data can be determined based upon an average of the values of the positive signal 302A and negative signal 302B. For example, as illustrated in FIG. 3, during a first time period 304A, the positive signal 302A and negative signal 302B alternate between the low and medium values, thus having an average value between low and medium, which signals a low value ("0") for the common mode control data. On the other hand, during a second time period 304B, the positive signal 302A and negative signal 302B alternate between medium and high values, having an average value between medium and high, signaling a high value ("1") for the common mode control data.

In addition, a difference between the positive and negative signals 302A/B is used to determine the value of the transmitted audio data. For example, when the positive signal 302A is higher than the negative signal 302B (e.g., during the first time period 304A, the positive signal 302A is at medium, while the negative signal 302B is at low), the audio data is high. Similarly, when the positive signal 302A is lower than the negative signal 302B, the audio data is low. The value of the transmitted audio data may then be determined based upon FEM.

As such, by transmitting the signal 300 as a differential signal comprising both a positive signal 302A and a negative signal 302B, whether the signal 300 is signaling a "0" or "1" for the common mode control data can be differentiated based upon an average value of the positive and negative signals 302A/B. In addition, the value of the transmitted audio data can be determined based upon a difference between the positive and negative signals 302A/B, independently of whether the positive and negative signals 302A/B are ranging between low and medium (e.g., as in during the first time period 304A) or between medium and high (e.g., as in during the second time period 304B).

In some embodiments, the common mode control data of the signal 300 is coded using biphase mark coding. As such, the actual value of the control data is determined based upon the presence or absence of transitions (high to low, or vice versa) every two clock periods. In some embodiments, the clock period associated with the control data may be derived based upon the clock period associated with the audio data defined based upon an FEM coded signal as described above (e.g., as a multiple of the audio data clock).

Therefore, as illustrated in FIG. 3, by transmitting a common mode differential signal, audio data, an audio data clock, control data, and a control data clock may all be transmitted across a single physical channel, allowing for concurrent transmission of audio and control data. The audio data is transferred at a first rate as represented by the shifting of differential signals 302A, 302B, while the control data is transmitted at a second rate as represented by the change shifting of average voltage levels of the two differential signal 302A, 302B. The second rate is slower that the first rate. That is, multiple bits of audio data are transmitted during a period while only one bit of common mode control data is transmitted. For example, in some embodiments, the first rate in which the audio data is transmitted may be between 4 Mbps and 98 Mbps, while the second rate at which the control data is transmitted may be approximately 1 Mbps.

In some embodiments, the audio data may be transmitted at a substantially constant rate throughout the during the bidirectional communication. On the other hand, control data may be transmitted sporadically when necessary. Also, when control data is not being transmitted, the value of the common mode signal may be in a floating state. However, the audio data may continue to be transmitted using the differential signals, as the difference between the positive and negative signals can be determined independently from the average of the positive and negative signals. In addition, the control data, when transmitted, does not depend upon the value of the transmitted audio data, as the average of the positive and negative signals of the differential signals during a time period does not depend upon the difference between the positive and negative signals. As such, the transmission of the audio data using differential signals and the control data using common mode allows for the control data to be transmitted without any dependence on the audio data, and vice versa.

Establishing Bidirectional Communication

FIGS. 4A and 4B illustrate example state diagrams establishing bidirectional communication between the sink device 104 and the source device 102, in accordance with one embodiment. Because there are a large variety of different source and sink devices available having different capabilities, a particular sink device may be connected to a first source device that supports bidirectional communication, or to a second source device corresponding to a legacy device that does not support bidirectional communication. As such, before bidirectional communication commences, the sink device first verifies that connected source device actually supports bidirectional communication. The source device initiates the bidirectional communication with the source device if it supports bidirectional communication. Otherwise, bidirectional communication is not initiated. As used herein, transmission of audio data from sink to source, without concurrent transmission of bidirectional control data, may be referred to as communication over an audio return channel (ARC). On the other hand, a bidirectional communication channel allowing for transmission of audio data from sink to source with concurrent transmission of bidirectional control data may be referred to as an enhanced audio return channel (eARC).

FIG. 4A illustrates a state diagram 400A for a source Tx/Rx implemented on a source device, in accordance with one embodiment. FIG. 4B illustrates a state diagram 400B for a sink Tx/Rx implemented on a sink device, in accordance with one embodiment. The source and sink Tx/Rx (hereafter referred to as "source" and "sink" for ease of discussion) may correspond to the source and sink bidirectional Tx/Rx 112 and 114 implemented on the source device 102 and sink device 104 illustrated in FIG. 1. Because the states experienced by the source (illustrated in state diagram 400A) and by the sink (illustrated in state diagram 400B) mirror each other, the states of both are discussed in conjunction below. In the illustrated state diagrams 400A and 400B, thick solid lines indicate that transition between two states of the device (the source for state diagram 400A, and the sink for state diagram 400B) is caused by an action by the device, while a thin solid line indicates that the transition between two states is caused by an action originating from an external device.

As illustrated in FIGS. 4A and 4B, both the source and sink may begin in an initial idle state (IDLE1). When the source and sink are connected via an interface cable (e.g., an HDMI cable), the source and/or sink are able to detect the connection via a hot plug detect (HPD) port. Upon detection that that the source and sink device have been connected (e.g., HPD=1), the source and sink will transition to a first discovery state (DISC1). When a connection is formed between the source and sink devices (e.g., by connecting an HDMI cable between the devices), the sink device may transmit identification information to the source device through a designated port (e.g., a HPD port), informing the source device of the presence of the sink device and one or more capabilities of the sink device. In some embodiments, the sink device transmits EDID information (not shown) to the source device through a port of the interface cable (e.g., the data display channel (DDC) port of the HDMI cable) in response to detection of the connection (e.g., HPD=1).

While in a discovery state, the source and sink may attempt to establish eARC communication. If the source supports eARC communication, the source will periodically transmit a comma signal (discussed in greater detail below) to the sink. The comma signal may be transmitted with a particular cadence. For example, the source may transmit the comma signal over a predetermined period of time (e.g., 10 ms), whereupon it waits for a reply signal (e.g., a set_eARC_valid signal from the sink) over a predetermined period of time (e.g., 10 ms), indicated in the state diagram 400A as a second discovery state (DISC2), before transmitting another comma signal (in state DISC1).

The sink, during the first discovery state (DISC1), waits for the comma signal to be received from the source. Upon receipt of the comma signal, the sink is made aware that the source supports eARC communication, and transitions to the second discovery state (DISC2), where it transmits a reply to the source (e.g., the set_eARC_valid signal) acknowledging receipt of the common signal and indicating that it is ready to communication using eARC. In some embodiments, if the sink device is unable to transition to the eARC bidirectional communication state (e.g., unable to set its eARC_valid bit), it may ignore the received comma signal.

The source, in response to receiving the set_eARC_valid reply signal, sets a value of an eARC_valid bit, and transitions to a bidirectional communication state (eARC state). In addition, the source may transmit an acknowledgment signal (ACK) to the sink in response to receiving the set_eARC_valid reply signal from the sink. As such, the sink may also transition to the bidirectional communication state (eARC).

On the other hand, if the source is unable to set the eARC_valid bit, it may transmit a non-acknowledgement signal (NACK) to the sink. In response, the sink may return to the first discovery state (DISC1) where it waits to receive another comma signal.

Figure 5A:
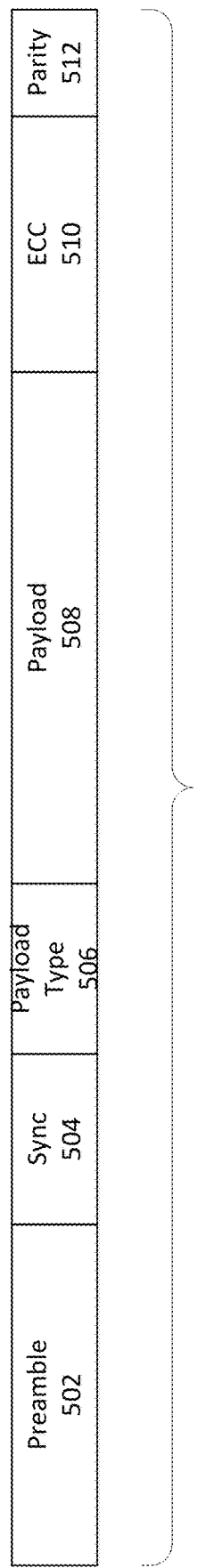
FIG. 5A illustrates a payload packet format in accordance with one embodiment.

During the bidirectional communication state (eARC state), the source and sink may concurrently transmit common mode control data and audio data overlaid on top of each other (e.g., as illustrated in FIG. 3). For example, the control data may comprise HDCP control data, eARC capabilities data, and/or other types of control data. In addition, a heartbeat signal (which may correspond to one or more transmitted packets corresponding to a series of transactions, described in greater detail below in relation to FIGS. 5 and 6) is transmitted between the source and sink throughout the duration that the source and sink are in the eARC state. The heartbeat signal may comprise a series of one or more transactions (e.g., read transactions or write transactions) transmitted between the source and sink at periodic intervals as part of the control data. For example, a heartbeat may comprise the sink writing its current status to a designated address within the source, and reading a current status of the source. In some embodiments, the transmission of the set_eARC_valid signal from the sink to the source corresponds to write transaction forming a portion of a first heartbeat of the established eARC communication.

If the heartbeat signal is lost (e.g., not detected for at least a threshold amount of time), the eARC communication may end, whereupon the source and sink states may leave the eARC state and return to a discovery state (DISC1) to attempt to reestablish bidirectional communication.

If eARC is not established during discovery for at a threshold amount of time (e.g., 100 ms), the source and sink may transition out of discovery and go into an idle state (IDLE2), where the source and sink remain connected (HPD=1), but eARC communication is not active.

In embodiments where the source device does not support bidirectional eARC communication, legacy ARC communication optionally may be used. For example, after the failure of eARC discovery, the sink may initiate ARC communication, causing the source and sink to transition to the ARC state. Termination of ARC communication causes the source and sink to transition back to an idle state (IDLE2).

After failure of eARC discovery (e.g., the source and sink being in the IDLE2 state), the source may optionally, after a predetermined period of time, re-attempt establishing eARC communication by transmitting a comma signal to the sink.

If the connection between the sink and source is broken (HPD=0), the sink and source may transition back to an initial idle state (IDLE1).

Example Comma Signal Discovery

As discussed above, eARC communication between a source and sink device may be established following a discovery phase, which verifies that the source supports eARC communication. In such embodiments, the source (e.g., the source bidirectional Tx/Rx 112 illustrated in FIG. 1) may transmit a comma signal to the sink (e.g., the sink bidirectional Tx/Rx 114 illustrated in FIG. 1), and wait for an acknowledgement signal from the sink.

The comma signal may comprise a series of 0 and 1 values (e.g., alternating 0 and 1 values) transmitted over a predetermined time period (e.g., 10 ms). The comma signal may be transmitted using an FEM scheme or a similar scheme. Following transmission of the comma signal, the source may wait for a predetermined period of time (e.g., 10 ms) for a response from the sink (e.g., a set_eARC_valid signal). If no response is received within the predetermined period of time, another comma signal may be transmitted. As such, the source may continue to operate with alternating periods of transmitting the comma signal and waiting for a reply from the sink, until the reply is received and eARC communication is established, or until a threshold period of time (e.g., ~100 ms) has passed, whereupon no eARC communication is established.

Transmission Payload

As discussed above with reference to FIG. 4, control data transmitted between the sink and source may be used to communicate status information between the sink and source devices, as well as transmit commands received by the sink device to the source device to configure one or more settings of the source device. The control data may be transmitted in half-duplex where control data may be transmitted from sink to source, or from source to sink, but not simultaneously.

The bidirectional communication between the source and sink may be implemented as a master-slave relationship. For example, the sink device may be the master, while the source device operates as the slave. All transmission of control data using eARC communication is initiated by the master. As used herein, "master" may be used to refer to the sink, while "slave" may be used to refer to the source. Because the transmission of control data is bidirectional, either the master or slave may correspond to a sending device or a receiving device in a given transmission.

The master transmits control data to the slave, followed by a defined response window corresponding to a predetermined time period in which the slave may respond, thus avoiding any collisions between the transmitted data. In some embodiments, the master is configured to periodically transmit control data initiating a transaction (e.g., read or write transaction) to the slave functioning as a heartbeat signal, which is discussed in greater detail below.

The control data may be transmitted in the form of packets, each of which conforms to a particular format. FIG. 5 illustrates a payload packet format, in accordance with one embodiment. As illustrated in FIG. 5, a packet 500 comprises a preamble 502, synchronization bits 504, a payload type indicator 506, a payload 508, error correction code (ECC) bits 510, and a parity bit 512. The data of the packet 500 may be transmitted using bi-phase mark encoding.

The preamble 502 comprises a predetermined number of bits having a particular value. For example, the preamble 502 may comprise a sequence of six bits all indicating a value of "1." The receiving device uses the time period in which the sending device transmits the preamble 502 in order to prepare for receiving the synchronization bits 504. For example, because control data may only be transmitted between the master and slave intermittently, the eARC channel may be floating during idle when no control data is being transmitted. The preamble bits may be used to recover the electrical levels of the eARC channel, such that the receiving device will be able to read the synchronization bits 504 when received.

The synchronization bits 504 comprises a predetermined number of bits having a particular value different from the preamble 502. For example, the synchronization bits 504 may comprise a sequence of four bits all indicating a value of "0." Transmission of the synchronization bits 504 may allow for the sending and receiving devices to synchronize with each other in preparation of transmission of the packet payload.

Figure 5B:
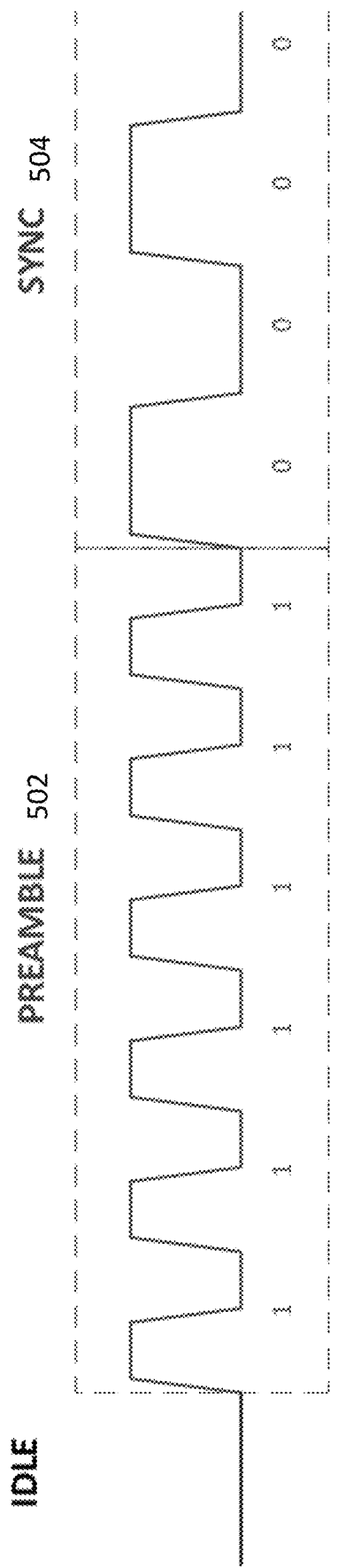
FIG. 5B illustrates an example of the preamble and synchronization bits of a packet transmitted using bi-phase mark encoding, in accordance with some embodiments.

Because the packet 500 (including the preamble 502 and synchronization bits 504) may be transmitted using bi-phase mark encoding, the preamble 502 and synchronization bits 504, despite each comprising the same logical value repeated multiple times, will comprise both electrical "0" and "1" signals. For example, FIG. 5B illustrates an example of the preamble 502 and synchronization bits 504 of the packet 500 transmitted using bi-phase mark encoding, in accordance with some embodiments.

The payload type indicator 506 indicates a type of data contained within the payload 508 of the packet 500. The payload may comprise a command, or may comprise a data payload. For example, a write transaction may be transmitted over a plurality of packets, including a first packet corresponding to a write command initiating the transaction, and one or more additional packets containing the data to be written. In some embodiments, the payload type indicator 506 may comprise a single bit, where a bit value of "1" indicates that the payload comprises a command, and a bit value of "0" indicates that the payload comprises data.

The payload 508 comprises a sequence of a predetermined number of bits corresponding to a command or data to be transmitted between the sending and receiving devices. For example, the payload may indicate a write command, a read command, data associated with a write or read command, and/or the like. In some embodiments, the payload 508 for each packet 500 comprises 1 byte (8 bits).

The ECC bits 510 comprises a predetermined number of bits used for protection and/or error correction of the payload 508. In some embodiments, the ECC bits 510 are configured to cover the payload type indicator 506, the payload 508, as well as the ECC bits 510 themselves. In some embodiments, the ECC bits 510 comprise four bits for each packet 500.

The parity bit 512 comprises a single parity bit calculated from the payload 508 and the ECC bits 510. In some embodiments, the parity bit 512 further functions to return the transmitted signal to an electrical "0" value. For example, under bi-phase mark encoding, a "1" value is encoded having a mid-point transition such that the signal level at the beginning and end of the bit are the same, while a "0" value is encoded with a mid-point transition such that the signal level at the beginning and end of the bit are different. The parity bit 512 may ensure an even number of "0" values within the packet 500, such that electrical signal level at the beginning of the packet will be the same as that at the end of the packet (e.g., an electrical "0" value). In some embodiments, the packet 500 may further contain one or more reserved bits (not shown).

Figure 6:
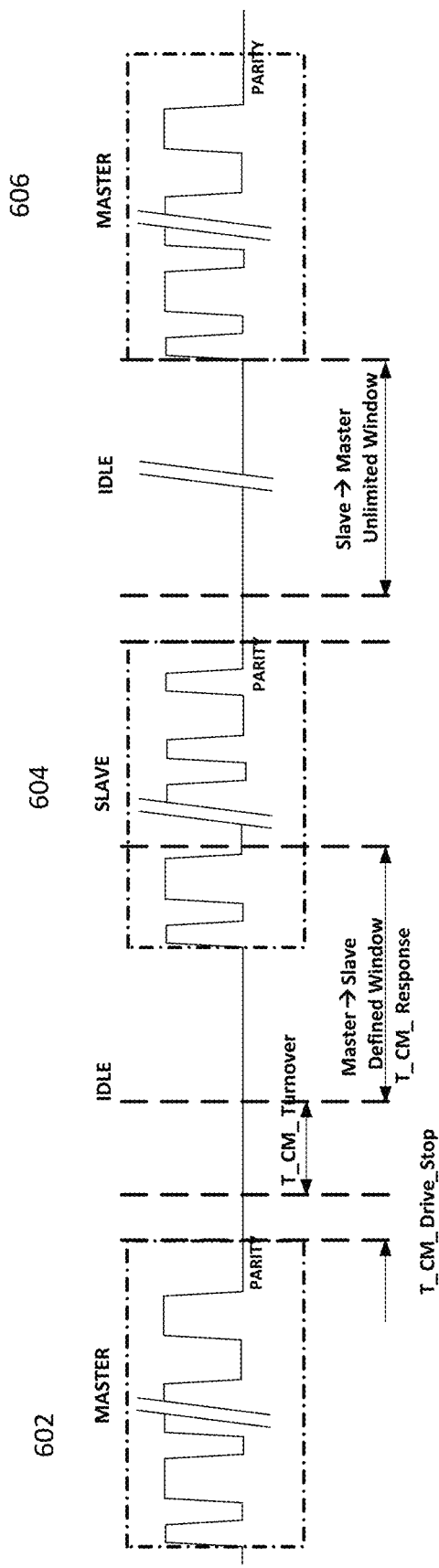
FIG. 6 illustrates a series of transmitted packets between a master and slave device, in accordance with one embodiment.

As discussed above, control data can be transmitted bidirectionally between the sink (master) and source (slave). FIG. 6 illustrates a series of transmitted packets between a master and slave device, in accordance with some embodiments. In order to avoid collisions, the control data is transmitted using a half-duplex scheme. As illustrated in FIG. 6, the master device transmits a first packet 602 to the slave device. The packet may comprise a command, or data associated with a previously transmitted command.

Following transmission of the first packet 602, the channel may enter an idle state during which a response packet 604 may be received from the slave device. The response packet 604 is to be received within a predetermined time period (e.g., 100 ms) from a start of the idle state following the transmission of the first packet 602 (referred to as the "response window"). The response packet 604 may begin transmitting within the response window. For example, as illustrated in FIG. 6, the last bit of the response packet 604 (e.g., the parity bit) can be transmitted after the response window has ended. In some embodiments, if master device does not begin receiving the response packet 604 by the end of the response window, the master device may re-transmit the first packet 602, starting a new response window during which the slave device may transmit a response.

After the master device receives the response packet 604, the channel may once again enter an idle state until the master device transmits a second packet 606 to the slave device. The second packet 606 may be transmitted any time after the transmission of the response packet 604, and is not restricted to being transmitted within a particular time period.

As such, as illustrated in FIG. 6, transmission of packets from slave to master is restricted to response windows following the transmission of a packet from master to slave, while packets from master to slave may generally occur at any time (except for during a response window).

As illustrated in FIG. 6, in some embodiments, the beginning of the response window is separated from the end of the packet 602 by a drive stop time period (T_CM_Drive_Stop) and a turnover time period (T_CM_Turnover). The drive stop time period indicates a time period during which a sender of the previous packet (e.g., the master device) is to stop driving an electrical "0". As discussed above in relation to FIG. 5A, due the parity bit in each transmitted packet, each transmitted packet ends on an electrical "0". The turnover time period indicates a time period after which the receiver of the packet 602 (e.g., the slave device) may start driving its response packet 604. The response window for the slave device to respond thus begins after the turnover time period.

As the control data is transmitted bidirectionally (e.g., over the hotplug and UTIL lines of the HDMI cable), audio data (e.g., eARC audio data) may be transmitted asynchronously from the sink device (e.g., master device) to the source device (e.g., slave device). Because the audio data is transmitted differentially and independently of the value of the control data, the transmission of control data is able to switch directions (e.g., from master to slave, and from slave to master) without affecting the transmission of the audio data.

Example Control Data Commands

Each packet of control data transmitted from the master device to the slave device may prompt a response packet from the slave device to the master device. Such an arrangement is advantageous, among other reasons, because regular acknowledgement is enabled by each device that the packets transmitted to the other device were received successfully. The packets of control data may comprise commands, or may contain data associated with a previously transmitted command.

Table 1 below illustrates example commands that may be transmitted between the master and slave devices. In some embodiments, certain types of commands are only transmitted by the master to the slave, while other types of commands are transmitted from the slave to the master.

TABLE 1

| Command | Command Name | Transmitted By | Description |
|---|---|---|---|
| Read | <eARC_READ> | Master | Start of a read transaction |
| Write | <eARC_WRITE> | Master | Start of a write transaction |
| Acknowledgement | <ACK> | Slave | Packet from master received without error |
| Non-Acknowledgement | <NACK> | Slave | Indicates error, or to defer next packet from master |
| Continuation | <CONT> | Master | Packet from slave received without error. Slave to continue transmitting data |
| Stop | <STOP> | Master | End of transaction |

Groups of packets corresponding to commands and data can be grouped into a transaction. As used herein, a transaction is either a read transaction or a write transaction. For example, a master device may initiate a write transaction with a slave device, instructing the slave device to write data to one or more registers (e.g., to set a status of the slave device, issue one or more commands to the slave device, etc.), or a read transaction instructing the slave device to read data from one or more registers.

The master may initiate a read transaction by transmitting a <eARC_READ> packet to the slave, to which it receives an <ACK> packet in reply acknowledging receipt. The master subsequently transmits a <DEVICE ID> packet (a data packet containing an identification of the master device), and an <OFFSET> packet (indicating an address of the slave device from which data is to be read), and receives an <ACK> packet in response to each transmitted packet. The slave device subsequent begins transmitting data read from the address corresponding to the <OFFSET> packet, one data packet at a time (e.g., <Data0>, <Data1>, . . . <DataN>), whereupon the master transmits a <CONT> packet upon the receipt of each data packet, acknowledging to the slave device that the data was successfully received. Upon receipt of the last data packet (<DataN>), the master device transmits a <STOP> packet, indicating termination of the transaction, which may be acknowledged by the slave device using an <ACK> packet.

The master may initiate a write transaction by transmitting a <eARC_WRITE> packet to the slave, followed by a <DEVICE ID> and an <OFFSET> packet indicating an address to which data is to be written. The master then transmits one or more data packets (e.g., <Data0>, <Data 1>, . . . <DataN>) followed by a <STOP> packet after the last data packet is transmitted. The slave device acknowledges receipt of each packet by transmitting an <ACK> packet.

In some embodiments, if the master transmits a <DEVICE ID> packet that is not supported by the slave, the slave may transmit a <NACK> packet to the master, which may prompt the master to transmit a <STOP> packet to terminate the transaction.

In some embodiments, because a slave device may only transmit packets to the master device during designated response windows, the slave device may not always to ready to receive or send data during the designated response window. If the slave device is not ready to send/receive data, the slave device may instead transmit a <NACK> packet to the master in order to defer the transmission of data. For example, during a read transaction, the slave device may transmit a <NACK> if it is not ready to transmit a next data packet to the master. The master may reply with a <CONT> packet, starting a new response window, during which the slave may transmit the next data packet or another <NACK>.

Similarly, during a write transaction, if the slave is not ready to receive a data packet transmitted from the master, the slave may transmit a <NACK> to the master, causing the master to resent the data packet, starting a new response window. The slave may then transmit an <ACK> if it is able to receive the data (whereupon the master may continue transmission of subsequent data) or transmit another <NACK> if it is still unable to receive the data (prompting the master to continue to resend the data packet).

In some embodiments, any transmitted commands that are unsupported, or received with a parity error (e.g., indicated by parity bit 512) may be discarded by the receiving device without acknowledgement. The master device may then attempt to re-send the packet. For example, if the slave device discards a received packet from the master device, the master device, after detecting no response from the slave device, attempts to resend packet. If the master device discards a received packet from the slave device, the master device may resend the previous packet to the slave device.

Heartbeat and Virtual Signals

As discussed above with reference to FIG. 4, in order to maintain bidirectional communication between the source and sink devices, a heartbeat signal may be transmitted between the source and sink devices. The heartbeat signal may comprise a read transaction and a write transactions issued at regular intervals by the sink device (e.g., master device) to the source device (e.g., slave device). For example, in some embodiments, the sink device may initiate the read and write transactions (referred to collectively as the "heartbeat transaction") at intervals of approximately every 100 ms.

Successful completion of the heartbeat transaction indicates that the bidirectional communication link is still operational. In addition, the heartbeat transaction can be used to transfer data indicating a current state of the communication link. For example, the read transaction of the heartbeat transaction may be directed to a particular address of the source device corresponding to a source status register. Similarly, the write transaction may instruct the source to write into its status register data corresponding to a sink status. As such, successful completion of the heartbeat transaction allows for both source and sink device to receive the current status of the other device. A failure to complete a heartbeat transaction (either the read or write transaction) over a period of time (e.g., two intervals) may indicate a loss of heartbeat, breaking the communication link and causing the source and sink devices to transition to an idle or a discovery state. In some embodiments, the heartbeat transaction is an explicit signal separate from other control data transactions transmitted over the bidirectional communication link. In some embodiments, any successfully completed transaction between the source and sink devices over the bidirectional communication link may serve as a heartbeat transaction indication the operational state of the bidirectional communication link.

Table 2 below illustrates an example of the data stored in the status registers of the sink and source devices, in accordance with some embodiments. The reading and writing of the status registers may be used to replace the function of one or more ports of the communication channel. For example, because the HPD port in the HDMI cable is used for eARC communication, the value of the HPD port may be maintained using the status registers, instead of being physically toggled. As such, the status registers of the source and sink devices may be referred to as "virtual signals."

TABLE 2

|  | Offset | Bit 7 | Bits 6 | Bit 5 | Bit 4 | Bit 3 | Bit 2 | Bit 1 | Bit 0 |
|---|---|---|---|---|---|---|---|---|---|
| Sink Status | 0 × D0 |  |  |  |  | Re-Read EDID | Re-Auth Request |  | e-ARC HPD |
| Source Status | 0 × D1 | eARC_valid | eARC_initiate |  |  |  |  |  | Vid-HPD |

As illustrated in Table 2 above, the physical HPD port of the HDMI cable may be replaced with registers corresponding to a virtual HPD signal, wherein the value of the HPD port can be expressed by transmitting read and write transactions corresponding to the virtual HPD registers.

For example, the Vid-HPD (also referred to as virtual HPD), corresponding to bit 0 of the status register of the source device, may function as a virtual replacement for data transmitted through the physical HPD port on the HDMI cable from the sink device to the source device. On the other hand, the eARC_HPD, corresponding to bit 0 of the status register of the sink device, may serve as a functional equivalent of the physical HPD, in the reverse direction, during implementation of eARC.

In some embodiments, the use of virtual signals for HPD may avoid toggling of the physical HPD during bidirectional communication. In some cases, the physical HPD may be toggled if the EDID of the sink device has changed (e.g., due to a connected AVR being turned on), the sink device may signal the change to source device via an HPD toggle. In other cases, if the sink device is a legacy device and detects above a threshold number of errors when decoding received data, the sink device may toggle HPD in order to force the source device to restart authentication. However, by replacing the functionality of the physical HPD of the HDMI cable with virtual signals, toggling of the HPD that may interrupt bidirectional communication is prevented.

Example Process Flow

Figure 7:
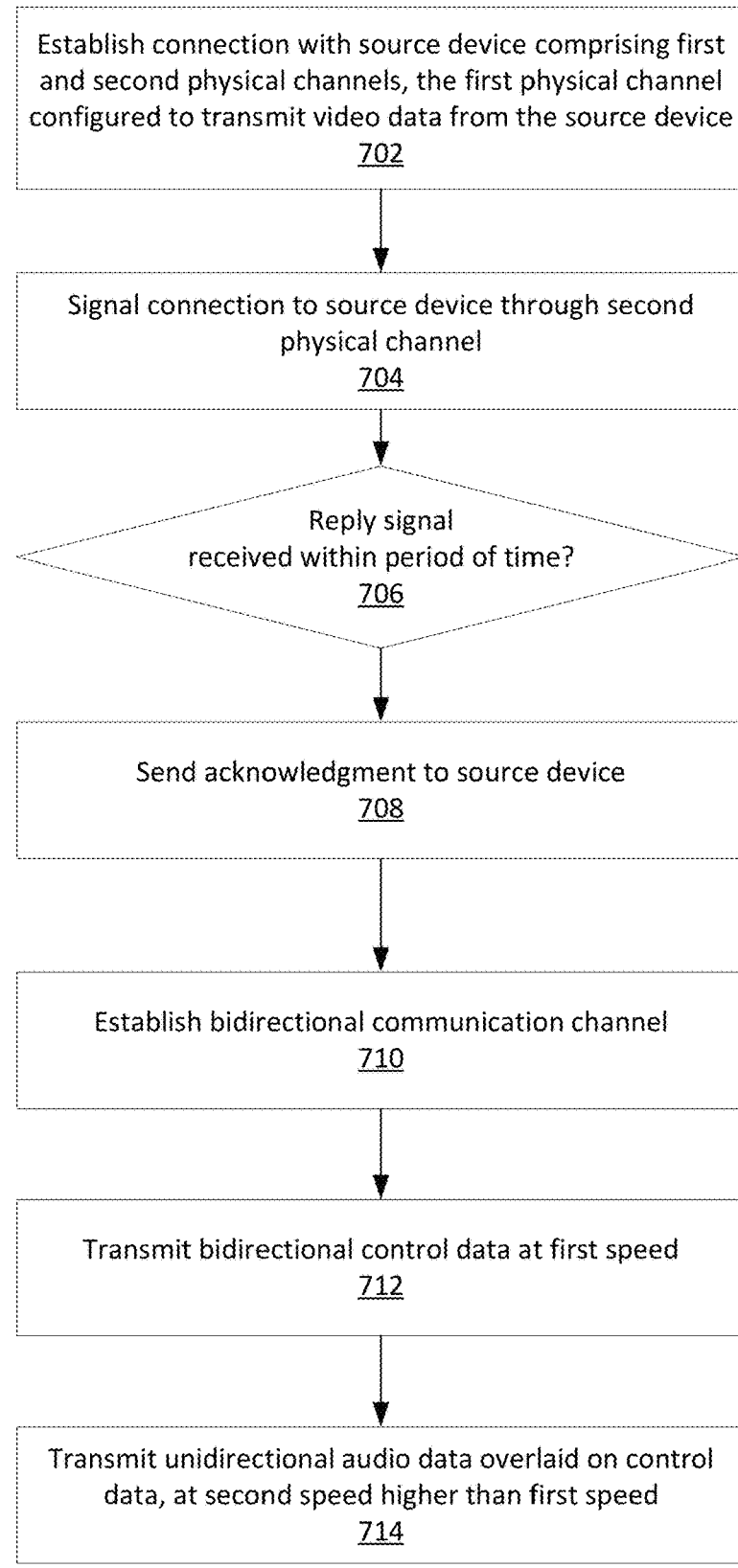
FIG. 7 is a flowchart of a process for establishing an eARC bidirectional communication channel between a source and a sink device, in accordance with one embodiment.

FIG. 7 is a flowchart of a process for establishing an eARC bidirectional communication channel between a source and a sink device, in accordance with one embodiment. The source and sink devices are connected over a first and second physical channels. For example, the source and sink devices may be connected by an HDMI cable. The first physical channel corresponds to the TMDS conductive line pair of the HDMI cable, while the second physical channel corresponds to conductive lines of the HPD and UTIL channels of the HDMI cable.

The sink device establishes 702 a connection with a source device, the connection comprising at least a first physical channel and a second physical channel separate from the first physical channel. In some embodiments, the first physical channel may be used to transmit video data unidirectionally from the source device to the sink device. In some embodiments, the connection may be formed using an HDMI cable.

When the source and sink devices are connected (e.g., using an HDMI cable), the sink device signals 704 the connection to the source device through the second physical channel. For example, the sink device may detect the connection through an HPD port of the HDMI cable, and transmit a signal to the source device indicating a status and/or an identifier of the sink device.

After the connection between the source and sink device is established through the second physical channel, the sink device may wait 706 for a reply signal to be received from the source device. The reply signal may comprise a comma signal periodically transmitted by the source device. The source device transmits the comma signal only if it supports eARC bidirectional communication. Because not all source devices (e.g., legacy source devices) may support eARC bidirectional communication, the transmission of the comma signal indicates to the sink device that the source device it is connected to supports eARC bidirectional communication.

If the reply signal is not received 706 within a predetermined period of time, the sink device may enter an idle state. In some embodiments, the sink device may attempt to initiate legacy audio return communication with the source device.

If the sink device receives the reply signal (e.g., comma signal), the sink devices transmits 708 an acknowledgment signal (e.g., a set_eARC_valid signal) indicating that eARC bidirectional communication should be established. The sink device then transitions 710 to an eARC bidirectional communication state.

Once eARC bidirectional communication has been established, the source and sink devices may transmit 712 bidirectional control data over the second physical channel at a first speed. The control data may comprise status information exchanged between the source and sink devices. In some embodiments, the control data may comprise commands received by the sink device changing one or more settings of the source device. For example, the sink device may receive commands from an external source (e.g., a remote control) which it transmits to the source device via the second physical channel using eARC bidirectional communication.

In some embodiments, the sink device functions as a master that initiates all transactions with the source device, which functions as a slave. For example, the sink device may transmit data to the source device by initiating a write transaction, and received data from the source device by initiating a read transaction. The sink and source devices communicate in a half-duplex mode, where after the sink device (master) transmits a packet to the source device (slave), the source device has a predetermined response window in which to initiate transmission of a reply packet.

The control data is transmitted using a common-mode signal comprising differential signal lines (e.g., an HPD line and a UTIL line). In some embodiments, the bit values of the transmitted control data are transmitted using biphase mark coding.

In addition, the sink device may transmit 714 unidirectional audio data over the second physical channel. The audio data may comprise audio return data received by the sink device to be played back by the source device. The audio data is transmitted using a differential signal (e.g., between the HPD and UTIL lines of the HDMI cable), and is transmitted at a second rate that is faster than the first rate. As such, the audio data may be overlaid on the transmitted control data. Because the audio data is transmitted using differential signals and the control data is transmitted using common mode, the audio data and control data may be transmitted independently of each other. In some embodiments, the audio data is transmitted using FEM coding.

Figure 8:
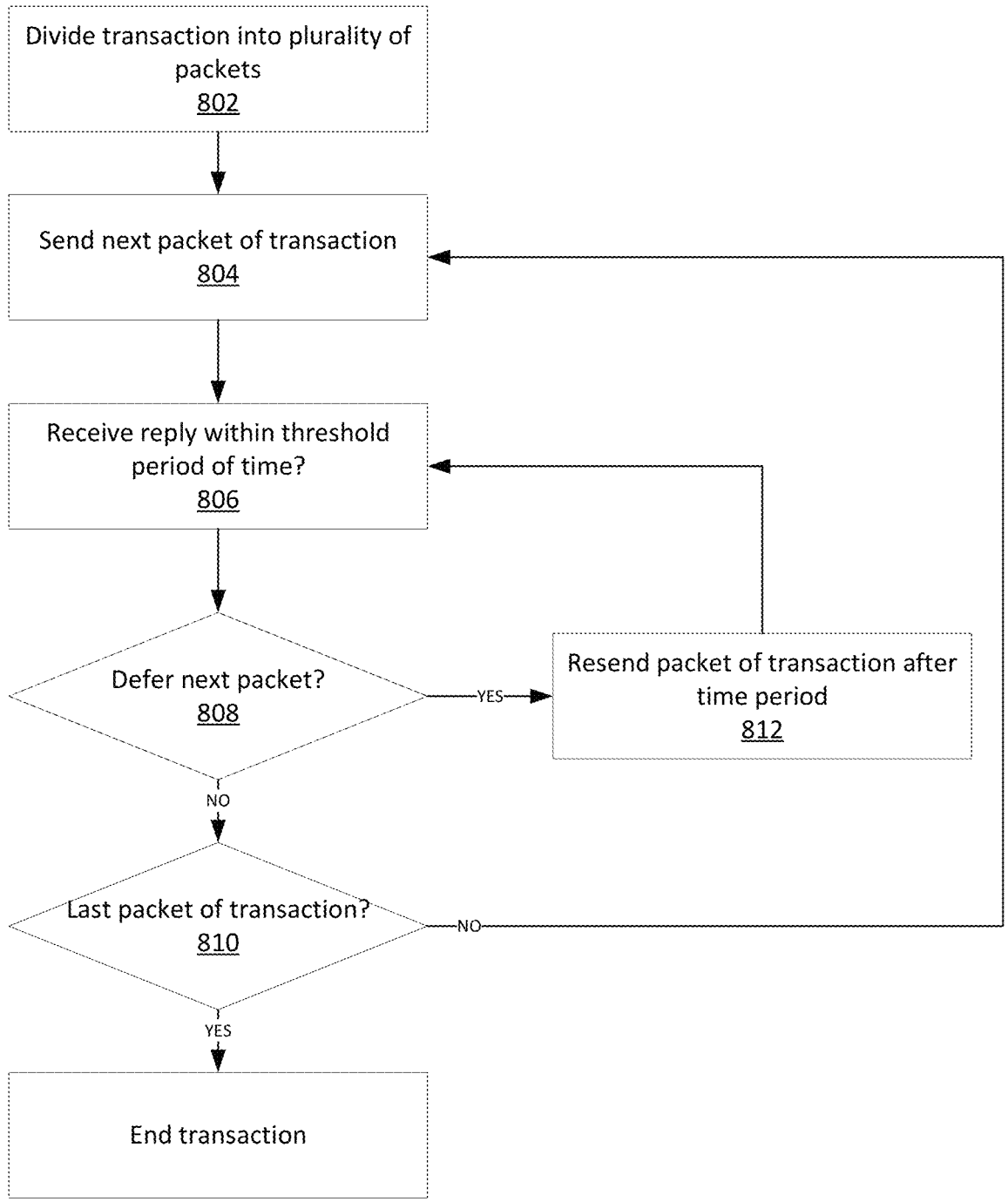
FIG. 8 is a flowchart of a process for processing a transaction using a bidirectional communication channel, in accordance with one embodiment.

FIG. 8 is a flowchart of a process for processing a transaction using eARC bidirectional communication, in accordance with some embodiments. In some embodiments, only the master device (e.g., the sink device) is able to initiate a transaction. The master device 802 divides a transaction into a plurality of packets. For example, a write transaction may comprise an initial packet indicating the start of the write transaction (e.g., <eARC_WRITE>), a device ID packet, an address/offset packet, one or more packets corresponding to data to be written, and a transaction end packet (e.g., <STOP>). Similarly, a read transaction may comprise an initial packet indicating the start of the read transaction (e.g., <eARC_READ>), a device ID packet, an address/offset packet, one or more packets based upon the data to be read, and a transaction end packet.

The master device sends 804 a packet of the transaction over the bidirectional communication channel to the slave device. For example, the master device may initiate the transaction by sending an initial packet indicating the type of transaction (e.g., <eARC_READ> or <eARC_WRITE>). During a write transaction, the transmitted packets may comprise packets of data to be written by the slave device. On the other hand, during a read transaction, the transmitted packets may comprise packets indicating that the master device is ready to receive additional data (e.g., <CONT> packets).

The master device receives 806 a response packet from the slave device within a threshold period of time. The slave device is required to respond to the transmitted packet from the master within a designated response window. In some embodiments, if a response packet is not received within the response window, then the master device may attempt to resend the transmitted packet to the slave device.

In some embodiments, the response packet may comprise an acknowledgment packet (e.g., <ACK>) acknowledging that the slave device has successfully received the transmitted packet from the master device. In embodiments where the transaction is a read transaction, the response packet may comprise a data packet corresponding to a portion of the read data. In some embodiments, if the packet transmitted by the master is unrecognized or unsupported (e.g., an unsupported device ID, invalid offset, and/or the like), the slave may return a <NACK> packet that prompts the master to terminate the transaction.

In some embodiments, the slave may defer the transaction. For example, the slave device may not be read to send read data or receive write data during a particular response window. In these cases, the slave may transmit a <NACK> packet to defer the receipt of write data from the master or the sending of read data to the master.

The master determines 808 if the received response packet defers the transaction (e.g., a <NACK> packet deferring transmission of read data or receipt of write data). If so, the master may resend 812 the transmitted packet. In some embodiments, the packet is resent after a particular time period. If the transaction is a read transaction, the master may resend a <CONT> packet, indicating that the master device is ready to continue receiving data. On the other hand, if the transaction is a write transaction, the master device may resend the previously transmitted data packet to be written by the slave device.

On the other hand, if the received packet does not defer the transaction, then the master determines 810 if the transmitted packet was the last packet of the transaction. If so, the transaction ends. On the other hand, if the transmitted packet is not the last packet of the transaction, then the master device transmits 804 the next packet of the transaction. The process may continue until the transaction concludes.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
  establishing a connection between a source device and a
    sink device, the connection comprising at least:

a first physical channel that transmits uncompressed video data unidirectionally from the source device to the sink device, and a second physical channel separate from the first physical channel that transmits a signal comprising a common mode signal comprising control data transmitted as a plurality of packets bidirectionally between the source device and the sink device, and an audio signal comprising audio data transmitted unidirectionally from the sink device to the source device, the audio signal overlaid on the common mode signal;

processing a transaction as part of the control data transmitted over the second physical channel between the source and sink devices, the transaction corresponding to a plurality of packets, by transmitting packets of the plurality of packets from the sink device to the source device over the second physical channel and receiving at the sink device respective response packets, wherein the sink device sends a next packet of the plurality of packets to the source device responsive to receiving, from the source device over the second physical channel, a respective response packet transmitted within a predetermined period of time after transmission of a previous packet of the plurality of packets;

transmitting over the second physical channel a periodic heartbeat signal to the source device, the heartbeat signal comprising a read or write transaction;

receiving from the source device an acknowledgement of the transmitted heartbeat signal; and discontinuing bidirectional communication with the source device responsive to a failure to receive an acknowledgment of the heartbeat signal within a predetermined period of time.

2. The method of claim 1, wherein the common mode signal is transmitted at a first speed, and the audio signal is transmitted at a second speed higher than the first speed.

3. The method of claim 1, wherein the plurality of packets comprises a first packet initiating the transaction, and one or more additional packets.

4. The method of claim 3, wherein the transaction comprises a read transaction, the response packets comprise data read from a designated address of the source device specified by the sink device, and the one or more additional packets comprise one or more packets acknowledging successful receipt by the sink device of a previously transmitted response packet.

5. The method of claim 3, wherein the transaction comprises a write transaction, and the one or more additional packets comprise data to be written to an address of the source device designated by the sink device, and the response packets comprise packets acknowledging successful receipt of a previously transmitted data packet by the source device.

6. The method of claim 1, wherein processing the transaction further comprises:

responsive to the sink device not receiving a response packet within the predetermined period of time, resending the previous packet from the sink device to the source device after the predetermined period of time.

7. The method of claim 1, wherein transmitting the respective response packet within the predetermined period of time comprises beginning transmission of the response packet within the predetermined period of time, and where a last bit of the response back is transmitted after the predetermined period of time.

8. The method of claim 1, wherein at least one of the respective response packets corresponds to a non-acknowledgment (NACK) packet, and wherein the sink device, responsive to receiving the non-acknowledgment packet from the source device, resends the previous packet of the plurality of packets.

9. The method of claim 1, wherein the heartbeat signal corresponds to a first write transaction in which the sink device transmits data indicating a current status to be written by the source device to a designated address within the source, and a second read transaction in which the sink device receives data from the source device indicating a current status of the source device.

10. The method of claim 1, wherein each packet comprises:

a preamble corresponding to a first known sequence of bits;

a synchronization signal corresponding to a second known sequence of bits;

one or more bits indicating a type of control data included in the packet;

a payload comprising control data included in the packet;

an error correction code (ECC) sequence based upon the payload; and a parity bit based upon the payload and the ECC sequence.

11. The method of claim 1, wherein the first and second physical channels are part of a High-Definition Multimedia Interface (HDMI) compliant cable.

12. A sink device, comprising:

a first receiver configured to connect to a first physical channel for receiving uncompressed video data from a source device, the first physical channel being a unidirectional physical channel;

a transmitter/receiver configured to:

connect to a second physical channel separate from the first physical channel configured to transmit a signal comprising a common mode signal comprising control data transmitted as a plurality of packets bidirectionally between the source device and the sink device, and an audio signal comprising audio data transmitted unidirectionally from the sink device to the source device, the audio signal overlaid on the common mode signal;

process a transaction as part of the control data transmitted over the second physical channel, the transaction corresponding to a plurality of packets, by transmitting packets of the plurality of packets to the sourcedevice and receiving respective response packets, wherein the transmitter/receiver sends a next packet of the plurality of packets to the source device responsive to receiving, from the source device over the second physical channel, a respective response packet transmitted within a predetermined period of time after transmission of a previous packet of the plurality of packets;

transmit over the second physical channel a periodic heartbeat signal to the source device, the heartbeat signal comprising a read or write transaction;

receive from the source device an acknowledgement of the transmitted heartbeat signal; and discontinue bidirectional communication with the source device responsive to a failure to receive an acknowledgment of the heartbeat signal within a predetermined period of time.

13. The sink device of claim 12, wherein the common mode signal is transmitted at a first speed, and the audio signal is transmitted at a second speed higher than the first speed.

14. The sink device of claim 12, wherein the plurality of packets comprises a first packet initiating the transaction, and one or more additional packets.

15. The sink device of claim 14, wherein the transaction comprises a read transaction, the response packets comprise data read from a designated address of the source device specified by the sink device, and the one or more additional packets comprise one or more packages acknowledging successful receipt of a previously transmitted response packet by the sink device.

16. The sink device of claim 14, wherein the transaction comprises a write transaction, and the one or more additional packets comprise data to be written to an address of the source device designated by the sink device, and the response packets comprise packets acknowledging successful receipt of a previously transmitted data packet by the source device.

17. The sink device of claim 12, wherein the transmitter/receiver is further configured to process the transaction by:
responsive to the sink device not receiving a response packet within the predetermined period of time, resending the previous packet from the sink device to the source device after the predetermined period of time.

18. The sink device of claim 12, wherein at least one of the respective response packets corresponds to a non-acknowledgment (NACK) packet, and wherein the sink device, responsive to receiving the non-acknowledgment packet from the source device, resends the previous packet of the plurality of packets.

* * * * *